(12) United States Patent
Kikuchi

(10) Patent No.: US 7,898,912 B2
(45) Date of Patent: Mar. 1, 2011

(54) INTEGRATED CIRCUIT, OPTICAL DISK DEVICE, AND SIGNAL PROCESSING METHOD

(75) Inventor: Jun Kikuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 191 days.

(21) Appl. No.: 12/416,449

(22) Filed: Apr. 1, 2009

(65) Prior Publication Data

US 2009/0257333 A1    Oct. 15, 2009

(30) Foreign Application Priority Data

Apr. 11, 2008  (JP) .............................. 2008-104073

(51) Int. Cl.
*G11B 7/00* (2006.01)
(52) U.S. Cl. .............. 369/44.32; 369/44.28; 369/44.29; 369/124.1
(58) Field of Classification Search ........................ None
See application file for complete search history.

(56) References Cited

U.S. PATENT DOCUMENTS 5,760,991 A  6/1998  Semba 6,434,096 B1 *  8/2002  Akagi et al. .............. 369/44.32
6,985,419 B2 *  1/2006  Ikeda et al. .............. 369/53.23
7,218,582 B2 *  5/2007  Takahashi et al. ........ 369/44.32

FOREIGN PATENT DOCUMENTS

JP    2000-251289    9/2000

* cited by examiner

*Primary Examiner*—Muhammad N Edun
(74) *Attorney, Agent, or Firm*—McDermott Will & Emery LLP

(57) ABSTRACT

Before initiation of tracking control, an optical disk device performs an offset amount obtaining operation, in which a difference between a middle value of the amplitude of a tracking error signal and a predetermined reference value is obtained as an offset amount. After the initiation of the tracking control, the optical disk device initiates an attenuation operation, in which an offset amount attenuation section attenuates the offset amount obtained by the offset amount obtaining operation to obtain an attenuated offset amount, while initiating, with an initial value being 0, an estimation operation, in which an observer estimates the offset amount according to a tracking driving signal to obtain an estimated offset amount. The optical disk device corrects the tracking error signal by using the attenuated offset amount obtained by the attenuation operation and the estimated offset amount obtained by the estimation operation.

9 Claims, 3 Drawing Sheets

INTEGRATED CIRCUIT, OPTICAL DISK DEVICE, AND SIGNAL PROCESSING METHOD

CROSS REFERENCE TO RELATED APPLICATION

The disclosure of Japanese Patent Application No. 2008-104073 filed on Apr. 11, 2008 including specification, drawings and claims is incorporated herein by reference in its entirety.

BACKGROUND OF THE INVENTION

1. Field of the Invention

The present disclosure relates to an integrated circuit, an optical disk device and a signal processing method for performing tracking control.

2. Description of the Related Art

An optical disk device described in Japanese Laid-Open Publication No. 2000-251289, when in normal mode, performs an estimation operation, in which the amount of shift in the position of an objective lens is estimated by an observer in accordance with the output of a tracking control circuit, and corrects a tracking error signal by adding an offset addition amount based on the estimated amount of the positional shift (which will be hereinafter referred to as an "offset addition amount based on the estimation operation"). If this optical disk device starts the normal mode operation simultaneously with starting tracking control, the control loop temporarily becomes unstable, causing a problem in that the optical disk device cannot start recording and reproduction until the control loop becomes stable. Therefore, before starting tracking control, the optical disk device performs an offset amount obtaining operation, in which the amount of offset is obtained by an offset detection circuit according to the tracking error signal. For a predetermined period of time after the initiation of tracking control, the optical disk device calculates an offset addition amount on the basis of the amount of offset obtained by the offset amount obtaining operation (hereinafter referred to as an "offset addition amount based on the offset amount obtaining operation", and corrects the tracking error signal by adding this offset addition amount. After the predetermined period of time has elapsed, the optical disk device starts the normal mode operation.

SUMMARY OF THE INVENTION

However, in the optical disk device in Japanese Laid-Open Publication No. 2000-251289, errors may occur in the amount of the positional shift estimated by the observer and in the amount of offset obtained by the offset detection circuit, and cause a difference between the offset addition amount based on the estimation operation and the offset addition amount based on the offset amount obtaining operation. If this difference between these offset addition amounts is increased, the corrected tracking error signal will vary abruptly at the time the normal mode is started, causing the tracking control to become unstable. As a result, the optical disk device cannot start recording and reproduction until the tracking control becomes stable, leading to an increase in access time and in start time.

In view of the above respects, it is therefore an object of the present invention to reduce access time and start time in an optical disk device.

In order to achieve the object, a principal aspect of the present invention is a signal processing method, performed in an optical disk device, for generating according to a tracking error signal a tracking driving signal indicating the amount of movement of an objective lens provided in an optical pickup, and for performing tracking control for moving the objective lens according to the tracking driving signal. The method includes the steps of: before initiation of the tracking control, performing an offset amount obtaining operation, in which a difference between a middle value of the amplitude of the tracking error signal and a predetermined reference value is obtained as an offset amount; after the initiation of the tracking control, initiating an attenuation operation, in which an offset amount attenuation section attenuates the offset amount obtained by the offset amount obtaining operation to obtain an attenuated offset amount, while initiating, with an initial value being 0, an estimation operation, in which an observer estimates the offset amount according to the tracking driving signal to obtain an estimated offset amount; and correcting the tracking error signal by using the attenuated offset amount obtained by the attenuation operation and the estimated offset amount obtained by the estimation operation.

According to the present invention, the tracking error signal is corrected by using the attenuated offset amount that is gradually decreased by the attenuation operation and the estimated offset amount that is gradually increased from 0 by the estimation operation. This allows the offset amount used in correcting the tracking error signal to gradually shift from the offset amount obtained by the offset amount obtaining operation to the estimated offset amount obtained by the estimation operation performed by the observer. Therefore, even if a difference arises between the offset amount obtained by the offset amount obtaining operation and the estimated offset amount obtained by the estimation operation, the corrected tracking error signal varies smoothly. Accordingly, it is possible to prevent tracking control from becoming unstable, so that the latency time for stabilizing tracking control is not likely to occur, thereby reducing access time and start time.

DETAILED DESCRIPTION OF THE INVENTION

Hereinafter, the preferred embodiments of the present invention will be described with reference to the accompanying drawings.

Figure 1:
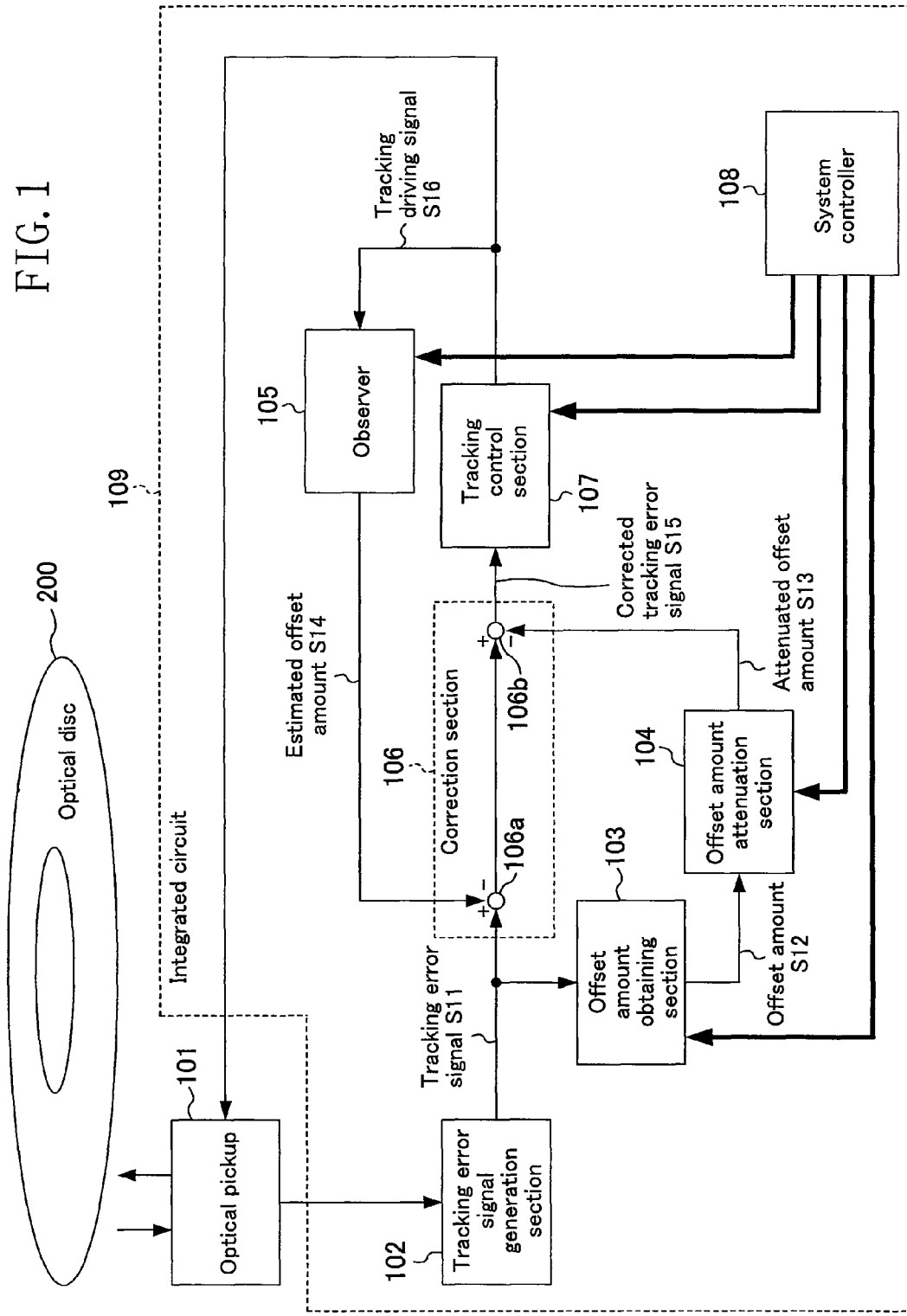
FIG. 1 is a block diagram illustrating the configuration of an optical disk device according to an embodiment.

As shown in FIG. 1, an optical disk device according to an embodiment of the present invention includes an optical pickup 101, a tracking error signal generation section 102, an offset amount obtaining section 103, an offset amount attenuation section 104, an observer 105, a correction section 106, a tracking control section 107, and a system controller 108, and records data on and reproduces data from an optical disc 200. The tracking error signal generation section 102, the offset amount obtaining section 103, the offset amount attenuation section 104, the observer 105, the correction section 106, the tracking control section 107, and the system controller 108 are included in an integrated circuit 109. The integrated circuit 109 may be composed of a single chip or a plurality of chips.

The optical pickup 101 applies laser light to the optical disc 200, and receives reflected light. The optical pickup 101 includes an objective lens, and moves the objective lens according to a tracking driving signal (which will be discussed later) generated by the tracking control section 107, thereby moving the laser light application position. In the optical pickup 101, reflected light from the optical disc 200 passes through the objective lens and a beam splitter into a two-part split PD (Photodetector), which outputs voltages corresponding to the amount of light received at each receiving surface.

According to the voltages output from the two-part split PD in the optical pickup 101, the tracking error signal generation section 102 generates a tracking error signal S11 indicating the physical distance in the radial direction between the track center, which is the target light-beam application position, and the actual application position of the light beam.

The offset amount obtaining section 103 obtains as an offset amount S12 a difference between the middle value of the amplitude of the tracking error signal S11 generated by the tracking error signal generation section 102 and a predetermined reference value (e.g., 0).

The offset amount attenuation section 104 retains the offset amount S12 obtained by the offset amount obtaining section 103, and attenuates the retained offset amount S12, thereby obtaining an attenuated offset amount S13.

The observer 105 estimates the offset amount that is the difference between the middle value of the amplitude of the tracking error signal S11 generated by the tracking error signal generation section 102 and the predetermined reference value according to a tracking driving signal S16 (which will be discussed later) output from the tracking control section 107, and obtains the estimation result as an estimated offset amount S14.

Figure 2:
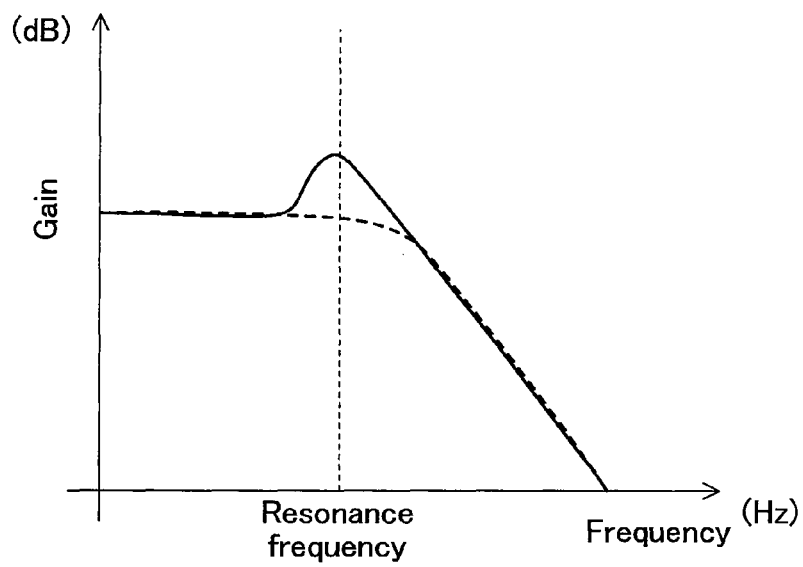
FIG. 2 is a graph representing the frequency characteristics of the gain of an offset amount attenuation section and the frequency characteristics of the gain of an observer in the optical disk device.

A predetermined multiple of the gain (the ratio of the attenuated offset amount S13 to the offset amount S12) of the offset amount attenuation section 104 and the gain (the ratio of the estimated offset amount S14 to the tracking driving signal S16) of the observer 105 have the same frequency characteristics. The solid line in the graph in FIG. 2 represents the frequency characteristics of the predetermined multiple of the gain of the offset amount attenuation section 104 and the frequency characteristics of the gain of the observer 105.

The correction section 106 corrects the tracking error signal S11 generated by the tracking error signal generation section 102 by subtracting the sum total of the attenuated offset amount S13 obtained by the offset amount attenuation section 104 and the estimated offset amount S14 estimated by the observer 105 from the tracking error signal S11, and outputs the obtained signal as a corrected tracking error signal S15. To be more specific, the correction section 106 includes subtracters 106a and 106b. The subtracter 106a subtracts the estimated offset amount S14 estimated by the observer 105 from the tracking error signal S11 and outputs the subtraction result. The subtracter 106b subtracts the attenuated offset amount S13 obtained by the offset amount attenuation section 104 from the output of the subtracter 106a.

The tracking control section 107 generates the tracking driving signal S16 indicating the amount of movement of the objective lens in the optical pickup 101, in accordance with the corrected tracking error signal S15 output from the correction section 106.

The system controller 108 controls the offset amount obtaining section 103, the offset amount attenuation section 104, the observer 105, and the tracking control section 107. Specifically, immediately before the initiation of tracking control, the system controller 108 makes the offset amount obtaining section 103 obtain the offset amount S12, and makes the offset amount attenuation section 104 retain the obtained offset amount S12. Also, simultaneously with the initiation of tracking control, the system controller 108 makes the offset amount attenuation section 104 initiate the attenuation operation for attenuating the retained offset amount S12, while making the observer 105 initiate the estimation operation for obtaining the estimated offset amount S14.

Figure 3A:
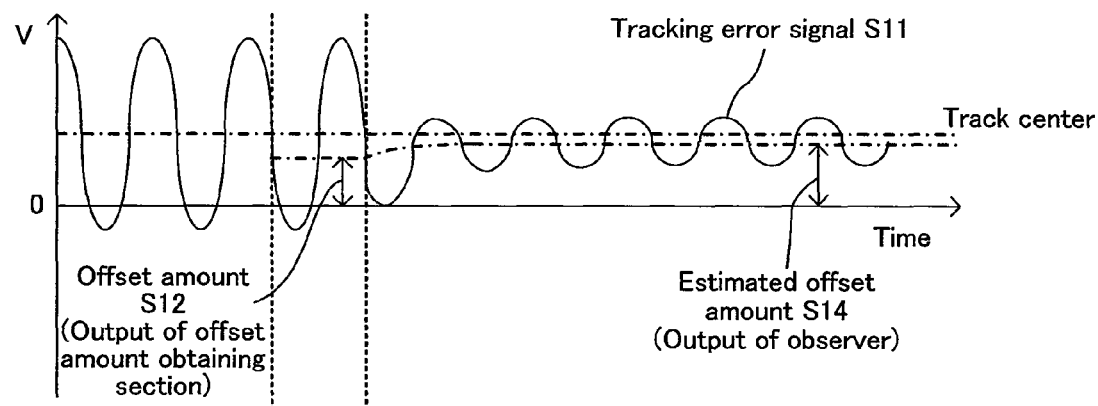
FIG. 3A is a waveform diagram of a tracking error signal S11 at the time tracking control is initiated in the optical disk device.
Figure 3B:
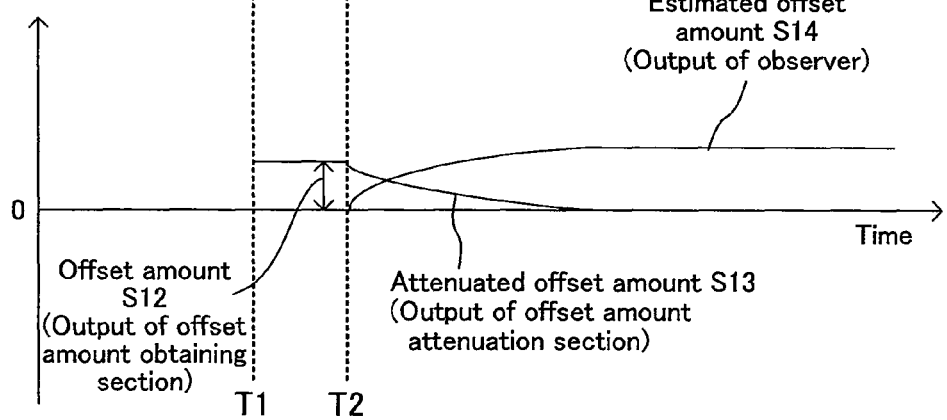
FIG. 3B is a waveform diagram of an attenuated offset amount S13 and an estimated offset amount S14 at the time tracking control is initiated in the optical disk device.

Now, referring to FIG. 3, a description will be made of how the optical disk device thus configured operates at the time tracking control is initiated.

Before the start of tracking control, the tracking driving value is 0, and the center of the amplitude of the tracking error signal is off from 0. At T1, which is immediately before the start of tracking control, the offset amount obtaining section 103 obtains the offset amount S12 in accordance with control performed by the system controller 108. The offset amount attenuation section 104 then retains the obtained offset amount S12. The offset amount S12 retained in the offset amount attenuation section 104 is subtracted in the subtracter 106b in the correction section 106.

At T2, which is immediately after T1, the system controller 108 makes the tracking control section 107 start the operation for generating the tracking driving signal S16, thereby initiating tracking control. Simultaneously with the initiation of the tracking control, the offset amount attenuation section 104 starts the attenuation operation for attenuating the offset amount S12 obtained by the offset amount obtaining section 103 immediately before the initiation of the tracking control, while the observer 105 starts the estimation operation for obtaining the estimated offset amount S14 in accordance with the tracking driving signal S16 with the initial value of the estimated offset amount S14 being 0.

Immediately after the initiation of the tracking control, the light beam application position is controlled so as to be in a position shifted from the track center by an error contained in the offset amount S12 obtained by the offset amount obtaining section 103. When the attenuation operation of the offset amount attenuation section 104 and the estimation operation of the observer 105 are started, the light beam application position gradually moves from the position shifted from the track center by an error contained in the offset amount S12 obtained by the offset amount obtaining section 103 to a position shifted from the track center by an error contained in the estimated offset amount S14 obtained by the observer 105.

Figure 4:
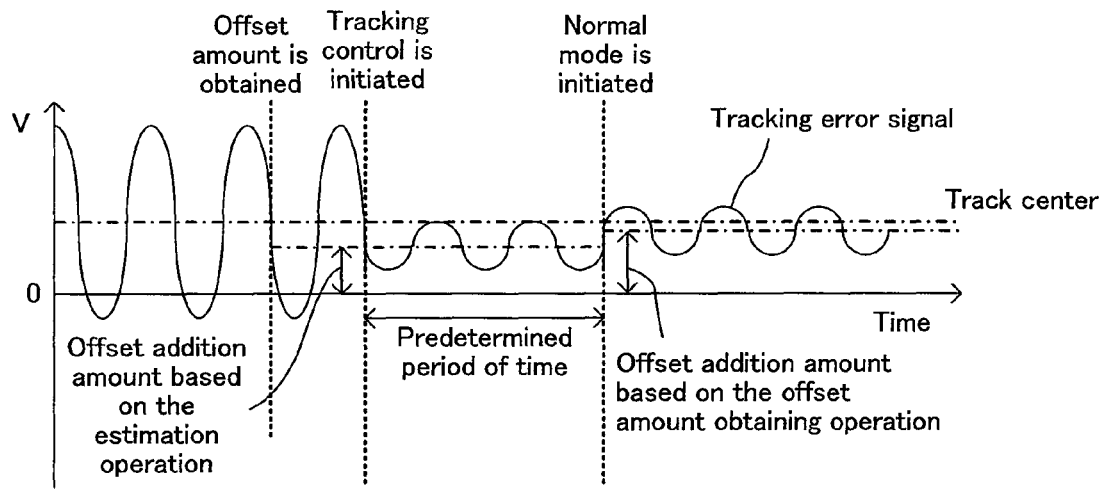
FIG. 4 is a waveform diagram of a tracking error signal at the time tracking control is initiated in a conventional optical disk device.

As shown in FIG. 4, the conventional optical disk device corrects the tracking error signal by using the offset addition amount based on the offset amount obtaining operation for a predetermined period of time after the initiation of tracking control. During this period of time, the light beam application position is controlled so as to be in a position shifted from the track center by an error contained in the offset addition amount based on the offset amount obtaining operation. After the predetermined period of time has elapsed, the optical disk device starts normal mode. That is, the optical disk device stops adding the offset addition amount based on the offset amount obtaining operation, and starts adding the offset addition amount based on the estimation operation. The light beam application position is thus controlled so as to be in a position shifted from the track center by an error contained in the offset addition amount based on the estimation operation. In this conventional optical disk device, when the normal mode is started, a difference between the offset addition amount based on the offset amount obtaining operation and the offset addition amount based on the estimation operation causes abrupt variations in the corrected tracking error signal, resulting in unstable tracking control.

On the other hand, in the optical disk device of this embodiment, since the attenuation operation of the offset amount attenuation section 104 and the estimation operation of the observer 105 are performed, the corrected tracking error signal S15, which is input to the tracking control section 107, varies smoothly, so that tracking control is not likely to become unstable. This prevents the laser light application position from shifting to a track adjacent to the target track, and hence the latency time for stabilizing tracking control is not likely to occur, thereby reducing access time and start time.

In order to enable the corrected tracking error signal S15 to vary smoothly, it is most desirable that a predetermined multiple of the gain of the offset amount attenuation section 104 and the gain of the observer 105 have the same frequency characteristics in all frequency bands as in the foregoing embodiment. Nevertheless, even if the predetermined multiple of the gain of the offset amount attenuation section 104 and the gain of the observer 105 have different frequency characteristics in bands in the vicinity of the resonance frequency, and have the same frequency characteristics in the bands other than those bands in the vicinity of the resonance frequency, the corrected tracking error signal S15 varies considerably more smoothly as compared to the conventional device. For example, the predetermined multiple of the gain of the offset amount attenuation section 104 may have such frequency characteristics as shown by the dotted-line waveform in FIG. 2. Also, even if the predetermined multiple of the gain of the offset amount attenuation section 104 and the gain of the observer 105 have different frequency characteristics, matching the cutoff frequency of the offset amount attenuation section 104 with that of the observer 105 enables the corrected tracking error signal S15 to vary considerably more smoothly as compared to the conventional device.

Figure 5:
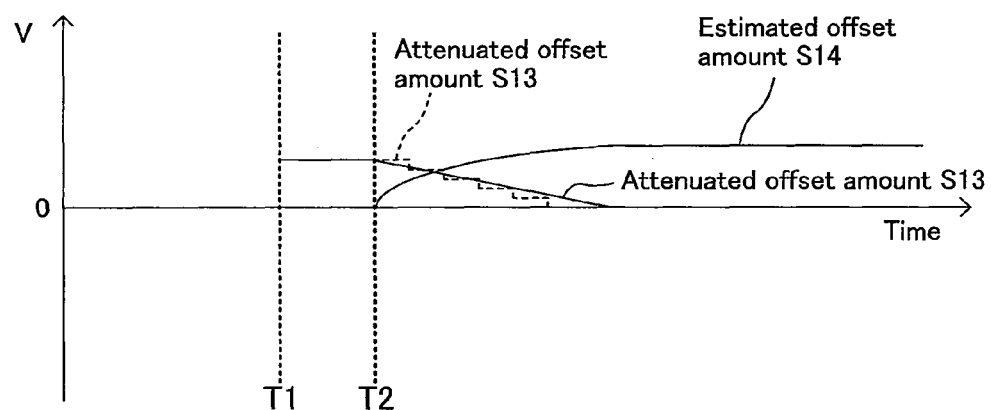
FIG. 5 is a waveform diagram of the attenuated offset amount S13 and the estimated offset amount S14 at the time tracking control is initiated in a modified example of the embodiment.

Furthermore, when the offset amount attenuation section 104 linearly attenuates the offset amount S12 as shown by the solid-line waveform in FIG. 5, or when the offset amount attenuation section 104 attenuates the offset amount S12 step by step as shown by the dotted-line waveform in FIG. 5, it is also possible to cause the corrected tracking error signal S15 to vary more smoothly as compared to the conventional device.

In the foregoing embodiment, the attenuation operation and the estimation operation are initiated simultaneously with the initiation of tracking control, but may be started after a predetermined period of time has elapsed from the initiation of tracking control. Moreover, the attenuation operation and the estimation operation do not need to be started exactly at the same time, but may be started with a time lag therebetween so long as the time lag does not cause the tracking control to become unstable.

Also, in the correction section 106, the tracking error signal S11 may be corrected by adding the sum total of the attenuated offset amount S13 obtained by the offset amount attenuation section 104 and the estimated offset amount S14 obtained by the observer 105.

The present invention is not limited to optical disk devices which perform both recording and reproduction, but is applicable to optical disk devices which perform either recording or reproduction.

The integrated circuit, optical disk device and signal processing method according to the present invention produce the effect of reducing access time and start-up time in optical disk devices, and are applicable to integrated circuits, optical disk devices, signal processing methods, etc. for performing tracking control, for example.

What is claimed is:

1. An integrated circuit, provided in an optical disk device, for generating according to a tracking error signal a tracking driving signal indicating the amount of movement of an objective lens provided in an optical pickup, and for performing tracking control for moving the objective lens according to the tracking driving signal, the integrated circuit comprising:

an offset amount obtaining section configured to perform an offset amount obtaining operation for obtaining a difference between a middle value of the amplitude of the tracking error signal and a predetermined reference value as an offset amount;

an offset amount attenuation section configured to perform an attenuation operation for attenuating the offset amount obtained by the offset amount obtaining section to obtain an attenuated offset amount; and an observer configured to perform an estimation operation for estimating the offset amount according to the tracking driving signal to obtain an estimated offset amount, wherein the offset amount obtaining section performs the offset amount obtaining operation before the tracking control is initiated; and after the initiation of the tracking control, the offset amount attenuation section initiates the attenuation operation, while the observer initiates the estimation operation with an initial value of the estimated offset amount being 0, and the tracking error signal is corrected by using the attenuated offset amount obtained by the offset amount attenuation section and the estimated offset amount obtained by the observer.

2. The integrated circuit of claim 1, wherein a predetermined multiple of the gain of the offset amount attenuation section and the gain of the observer have the same frequency characteristics in frequency bands other than frequency bands in the vicinity of a resonance frequency.

3. The integrated circuit of claim 2, wherein the predetermined multiple of the gain of the offset amount attenuation section and the gain of the observer have the same frequency characteristics.

4. The integrated circuit of claim 1, wherein the offset amount attenuation section attenuates step by step the offset amount obtained by the offset amount obtaining section, thereby obtaining the attenuated offset amount.

5. An optical disk device comprising:

the integrated circuit of claim 1, and the optical pickup.

6. A signal processing method, performed in an optical disk device, for generating according to a tracking error signal a tracking driving signal indicating the amount of movement of an objective lens provided in an optical pickup, and for performing tracking control for moving the objective lens according to the tracking driving signal, the method comprising the steps of:

before initiation of the tracking control, performing an offset amount obtaining operation, in which a difference between a middle value of the amplitude of the tracking error signal and a predetermined reference value is obtained as an offset amount;

after the initiation of the tracking control, initiating an attenuation operation, in which an offset amount attenuation section attenuates the offset amount obtained by the offset amount obtaining operation to obtain an attenuated offset amount, while initiating, with an initial value being 0, an estimation operation, in which an observer estimates the offset amount according to the tracking driving signal to obtain an estimated offset amount; and correcting the tracking error signal by using the attenuated offset amount obtained by the attenuation operation and the estimated offset amount obtained by the estimation operation.

7. The signal processing method of claim 6, wherein a predetermined multiple of the gain of the offset amount attenuation section and the gain of the observer have the same frequency characteristics in frequency bands other than frequency bands in the vicinity of a resonance frequency.

8. The signal processing method of claim 7, wherein the predetermined multiple of the gain of the offset amount attenuation section and the gain of the observer have the same frequency characteristics.

9. The signal processing method of claim 6, wherein in the attenuation operation, the offset amount obtained by the offset amount obtaining operation is attenuated step by step, thereby obtaining the attenuated offset amount.

* * * * *